United States Patent Office 3,508,562
Patented Apr. 28, 1970

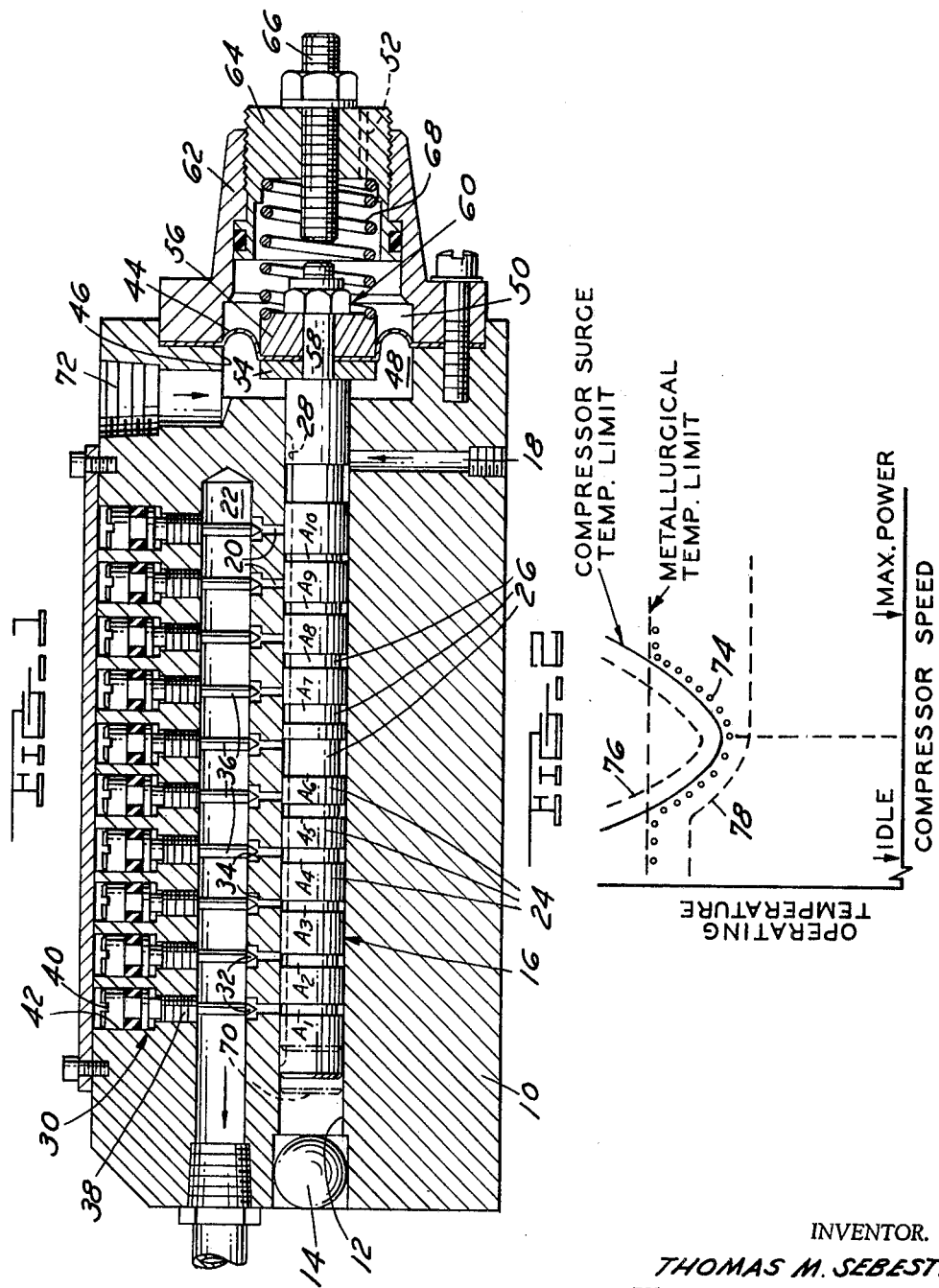

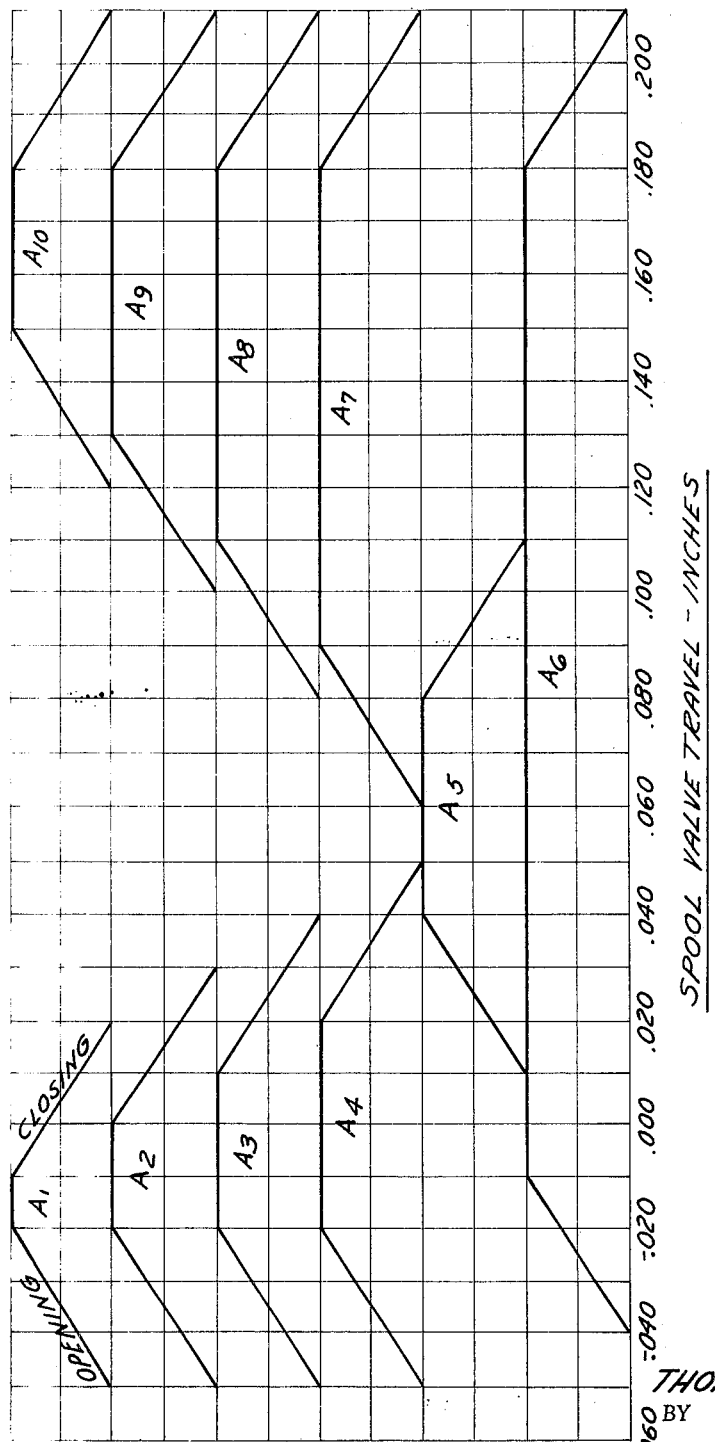

3,508,562
SPEED RESPONSIVE FLUID PRESSURE CONTROLLER
Thomas M. Sebestyen, Ann Arbor, Mich., assignor to Ford Motor Company, Dearborn, Mich., a corporation of Delaware
Filed May 1, 1968, Ser. No. 725,686
Int. Cl. G05d 13/30
U.S. Cl. 137—47                                    10 Claims

ABSTRACT OF THE DISCLOSURE

A speed responsive valve moves to restrictively control flow of fluid between a constant pressure inlet source and an outlet fluid manifold, the valve having a plurality of lands and interconnecting neck portions of varying width cooperating with adjustable needle valves in a manner to provide a desired output flow curve.

---

This invention relates, in general, to a fluid pressure scheduling device. More particularly, it relates to a controller that varies the pressure of a fluid as a function of the changes in speed of a rotating source of fluid under pressure.

The invention preferably is for use in a control system of the type, for example, that is shown and described in my copending application S.N. 717,536, filed Apr. 1, 1968, and entitled: Control System for a Motor Vehicle Type Gas Turbine Engine. As described therein, the engine preferably is operated at a temperature that is a maximum allowable value for the particular steady state compressor speed at which it is rotating, this value assuring that the metallurgical limits of the parts are not exceeded, and/or compressor surge does not occur.

One of the control parameters in the above system includes a scheduling cam that senses the changes in compressor speed and transposes them into a fluid pressure flow curve that is indicative of a specific desired temperature limit signal for each speed change. That is, the output of the scheduling cam is designed to follow a predetermined curve or schedule for each change in the input.

The construction of the above briefly described scheduling cam is the subject of this invention. More specifically, the invention consists of a spool type valve progressively movable by a fluid under pressure that varies as a function of the changes in speed of a rotating source of fluid to meter a predetermined quantity of fluid past individually adjustable needle valves to provide an output pressure signal that will vary with speed in a desired manner.

It is an object of the invention, therefore, to provide a fluid pressure controller that will provide an output pressure signal varying as a desired function of the changes in speed of a rotating source of fluid under pressure.

It is a further object of the invention to provide a fluid pressure controller consisting of a movable spool valve having a plurality of axially spaced lands interconnected by neck portions of reduced diameter; the axial extent of both the lands and neck portions varying randomly for cooperation with a number of axially spaced output passages, the flow through each of which is controlled by an adjustable needle valve; the valve being moved by fluid under pressure that changes as a function of the changes in speed of a rotating fluid pressure source to provide an ultimate output pressure that varies as a function of the degree of adjustment of each needle valve and the random axial width of each land and interconnecting neck portions.

Other objects, features and advantages of the invention will become more apparent upon reference to the succeeding detailed description thereof, and to the drawings illustrating a preferred embodiment thereof, wherein:

FIGURE 1 is a cross-sectional view of a control body embodying the invention;

FIGURE 2 illustrates graphically the degree of variance of the output pressure schedule with changes in compressor speed, for the control illustrated in FIGURE 1, and;

FIGURE 3 illustrates graphically the flow control of fluid past the individual interconnecting neck portions of the spool valve and the individual needle valves, of FIGURE 1.

As stated previously, the invention has particular use in the control system of a motor vehicle type gas turbine engine. However, it will be clear that it will have use in many other installations without departing from the scope of the invention where it is desired to provide a particular output pressure signal schedule varying as a function of changes in pressure of a speed responsive fluid input.

FIGURE 1 shows a valve body 10 having a central bore 12 closed at one end by, in this case, a ball plug 14. Slidable within the bore is a spool valve indicated in general at 16. Axial movement of the valve regulates the communication of fluid between an input or supply passage 18 and a plurality of outlet passages 20 discharging into a collector manifold or conduit 22. Passage 18, in this case, is supplied with fluid at constant pressure.

Spool valve 16 has a plurality of spaced constant diameter lands 24 interconnected by neck portions 26 of reduced diameter forming annular fluid pressure chambers $A_1$–$A_{10}$ between adjacent lands. The lands, as well as the annular fluid passages between, in this case, are of random axial widths, the axial spacing being preselected in such a manner as to provide an output pressure schedule of a chosen character. The annular fluid passages are all interconnected to each other by a longitudinally extending groove 28.

Discharge passages 20 are equally spaced axially from each other, and individual ones are aligned at times with various ones of the annular fluid passages $A_1$–$A_{10}$ to provide a selected total flow into collector manifold 22 varying as a function of the position of valve 16. The flow between passages 20 and manifold 22 is controlled by an adjustable needle valve 30 cooperatively projecting in an orificing manner into each of the passages 20.

Each needle valve consists of a tapered end portion 32 operably mounted in an enlarged bore 34 of each passage 20 for variably restricting flow through the passage as a function of the adjustment of the needle valve. The tapered end portion is joined by a stem 36 to a threaded upper portion 38 having a screw slotted terminus 40 slidably and sealingly mounted in an enlarged bore 42 of valve body 10.

It will be clear from the figures and description that rightward movement of valve 16, for example, to the position shown in full lines in FIGURE 1, aligns annular passages $A_1$, $A_2$, $A_3$, $A_4$ and $A_6$ with the respective adjacent passages 20 to discharge a predetermined flow of fluid from inlet 18 and groove 28 into the main conduit 22. This latter flow of course is determined by the selective adjustment of the needle valves 30.

Spool valve 16 is secured at its rightward end to a flexible annular diaphragm 44. The diaphragm is sealingly mounted across a recess 46 in valve body 10 to define an annular fluid pressure chamber 48 and an atmospheric pressure chamber 50. The latter is vented by a passage 52. Diaphragm 44 is clamped between a pair of retainers 54 and 56 through which the reduced stem 58 of valve 16 extends. The retainers and diaphragm are held to the valve by means of a washer and nut combination 60, as indicated.

Diaphragm 44 is sealingly mounted against valve body 10 by a conical like hollow cap 62, the end of which is closed by a cup shaped spring retainer 64 containing an adjustable valve stop 66. A spring 68, seated between the retainer 64 and a formed seat portion of retainer 50, normally biases valve 16 and diaphragm 44 to the position indicated by dotted line 70.

In this case, the annular fluid pressure chamber 46 is connected by a passage 72 to a source of fluid that varies in pressure as a function of the changes in speed of a rotating fluid pressure generator; such as, for example, a fluid gear pump driven by an engine accessory drive shaft.

In operation, it will be clear that with no fluid pressure in chamber 46, spring 68 will move spool valve 16 leftwardly to the dotted line position 70 and accordingly block fluid passage 18 so that fluid pressure exists in output collector line 22. As soon as fluid pressure is supplied to chamber 46, sufficiently to overcome the force of spring 68, the spool valve begins to move to the right to uncover line 18. The various annular chambers defined by the neck portions of the valve will then selectively communicate with the various connecting passages 20 to deliver a predetermined flow into these passages past the needle valves 30 in quantities determined by the restricted communication between the annular passages $A_1$–$A_{10}$ and passages 20 on the one hand, and the degree of adjustment of the needle valves 30 on the other hand.

More specifically, FIGURE 3 indicates the degree of communication of fluid from passage 18 into passages 20 for each increment of movement of spool valve 16. It will be seen that as the speed responsive fluid pressure in chamber 46 increases and the spool valve moves rightwardly, progressively, that the valve neck portion annular passages $A_1$, $A_2$, $A_3$, and $A_4$ will open progressively to admit more fluid into connecting passages 20. FIGURE 3 also shows that passage $A_4$ closes after $A_3$, and $A_3$ after $A_2$, and so forth; that $A_6$ is open for considerable length of time; that $A_5$ overlaps the closing of $A_4$ and the opening of $A_7$; and that, as the spool valve continues to move to the right with further increases in fluid pressure in chamber 46, the fluid flow continues to increase.

From an inspection of FIGURE 3, therefore, it will be seen that the fluid flow initially starts out high and begins to decrease progressively to a low point when the spool valve reaches about the midpoint of the $A_5$ annular passage, and that the fluid flow then again begins to increase progressively as it moves further to the right.

The above movement of the valve is, of course, determined by the selection of the axial widths of the individual lands of the spool valve; as well as the random widths and spacing of the neck portions interconnecting adjacent lands; and further by individual adjustment of each of the needle valves with respect to the out flow of passages 20.

As described previously, the invention has particular use as a scheduling cam in a motor vehicle type gas turbine engine control system disclosed in my copending application S.N. 717,536. In that application, it is desired to provide a scheduled fuel pressure signal force that varies in a predetermined manner as the compressor speed increases and decreases. In an engine of that type, during steady state conditions, the engine can operate at a temperature that is only so high before the parts fatigue. Also, only so high a temperature can be maintained before compressor surge is encountered.

FIGURE 2 illustrates, in full lines, a schedule that is typical for an engine of this type, and one that the temperature must follow as the compressor speed increases from idle to maximum power. For example, the figure indicates the metallurgical temperature limit of the parts of the engine as a horizontal dashed line, and a symmetrically curved full line as the compressor surge temperature limit. So long as the engine operating temperature remains just below the lower of the two curves, at any particular steady state compressor speed, the engine will operate safely and as desired. Accordingly, it is desirable for a portion of the control system to indicate in some manner just what the desired operating temperature should be at any particular compressor speed.

The invention accomplishs the above by varying the axial spacing of the valve lands and interconnecting neck portions, and the adjustment of the individual needle valves. That is, the land and interconnecting neck portion widths are so chosen, and the needle valves so adjusted, that as the compressor speed responsive pressure source in chamber 46 changes, the output pressure signal in line 22 will correspond to that indicated by and be indicative of the operating temperature changes indicated by the position 74, for example, in FIGURE 2. Thus, as previously described, as the spool valve moves rightwardly, the pressure signal in line 22 indicative of the temperature limit line will first start out high (FIGURE 3) and progressively lower to a minimum at about the midportion of the $A_5$ interconnecting neck portion, and then progressively increase again to the metallurgical temperature limit.

From the foregoing, therefore, it will be seen that the invention provides a fluid pressure scheduling device that varies an output fluid pressure signal in a desired manner as a function of the changes in pressure of a controlling or input fluid pressure source. For example, the rise and fall of the output pressure in line 22 can be made to follow the dotted line curves 76 or 78, for example, in FIGURE 2, or other suitable curves, as desired, merely by changing the axial widths of the valve, the axial width of the interconnecting neck portions, and individually adjusting each of the needle valves 30, as desired.

While the invention has been described in its preferred embodiment, it will be clear to those skilled in the arts to which it pertains that many changes and modifications may be made thereto without departing from the scope of the invention.

What is claimed is:

1. A speed responsive fluid pressure signal generator comprising in combination, a valve housing having a plurality of fluid inlets each containing a fluid and a fluid outlet and a valve axially slidably movable in said housing in a manner variably controlling the flow of fluid from one of said inlets to said outlet, another of said inlets containing a speed responsive source of fluid under pressure that varies as a function of the change in speed of said source, and means connecting said source to said valve to act thereon moving said valve as a function of the change in speed of said source, said valve having a plurality of cross-flow passages randomly spaced in an axial direction and each connected at all times to each other and connectible to the fluid in said one inlet upon predetermined positioning of said valve, said housing containing a plurality of axially spaced openings connected to said outlet and radially alignable in part or whole with various ones of said cross passages as a function of the axial position of said valve.

2. A speed signal generator as in claim 1, said valve comprising a spool type valve having a plurality of axially spaced lands having random axial spacing and being interconnected by neck portions of reduced diameter, said lands each having a fluid passage extending therethrough connecting the neck portions adjacent thereto to the fluid in said one inlet.

3. A speed signal generator as in claim 1, said valve comprising a spool type valve having a plurality of axially spaced lands interconnected by neck portions of reduced diameter having random axial spacing, said lands each having a fluid passage extending therethrough fluid connecting the neck portions adjacent thereto to the fluid in said one inlet.

4. A speed signal generator as in claim 1, said valve comprising a spool type valve having a plurality of axially spaced lands having random axial spacing and being interconnected by neck portions of reduced diameter also having random axial spacing, said lands each having a fluid passage extending therethrough fluid connecting the neck portions adjacent thereto to the fluid in said one inlet.

5. A signal generator as in claim 1 including an adjustable flow restricting means in each of the connections between each cross-flow passage and said outlet to vary the total flow of fluid from said one inlet into said outlet.

6. A speed signal generator as in claim 5, said flow restricting means each comprising a needle-like valve adjustably mounted for cooperation with said housing openings for selective individual variance of the flow area of each opening.

7. A signal generator as in claim 1, including means biasing said valve in one direction, said speed responsive fluid pressure moving said valve in the opposite direction.

8. A signal generator as in claim 7, including movable fluid pressure actuated means secured to said valve at one end and moved in one direction by the fluid pressure from said source, and spring means biasing said fluid pressure actuated means in the opposite direction.

9. A signal generator as in claim 7, said housing having a flexible diaphragm mounted across an opening in said housing to define therewith a fluid chamber connected to said speed responsive source for movement of said diaphragm by the fluid pressure from said source, said diaphragm being fixedly secured to said valve.

10. A speed responsive fluid pressure signal generator comprising in combination, a valve housing having a plurality of fluid inlets each containing fluid and a fluid outlet and a valve axially slidably movable in said housing in a manner variably controlling the flow of fluid from one of said inlets to said outlet, another of said inlets containing a speed responsive source of fluid under pressure that varies as a function of the change in speed of said source, and means connecting said source to said valve to act thereon moving said valve as a function of the change in speed of said source, said valve having a plurality of cross-flow passages randomly spaced in an axial direction and each connected at all times to each other and to the fluid in said one inlet subsequent to the predetermined positioning of said valve, said housing containing a plurality of axially spaced openings connected to said outlet and radially alignable in part or whole with various ones of said cross passages as a function of the axial position of said valve, and an adjustable flow restricting means in each of the connections between said cross-flow passage and said outlet to vary the total flow of fluid from said inlet into said outlet.

References Cited

UNITED STATES PATENTS

| | | | |
|---|---|---|---|
| 2,972,359 | 2/1961 | Joukainen | 138—46 |
| 3,073,349 | 1/1963 | Mitchell | 251—172 X |
| 3,092,141 | 6/1963 | Stark | 137—608 |
| 3,125,118 | 3/1964 | Zeisloft | 137—51 X |
| 3,160,213 | 12/1964 | Fischer | 137—47 X |

CLARENCE R. GORDON, Primary Examiner

U.S. Cl. X.R.

137—608; 138—46; 251—61, 126